(12) United States Patent
Rawal et al.

(10) Patent No.: US 6,558,785 B1
(45) Date of Patent: May 6, 2003

(54) INSULATED REENTRY HEAT SHIELD

(75) Inventors: Suraj Prakash Rawal, Littleton, CO (US); Janine M. Thornton, Elizabeth, CO (US); William H. Willcockson, Morrison, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/368,917

(22) Filed: Aug. 5, 1999

Related U.S. Application Data

(60) Provisional application No. 60/095,674, filed on Aug. 7, 1998.

(51) Int. Cl.⁷ ................................................. B32B 3/26
(52) U.S. Cl. ..................... 428/312.8; 428/103; 428/167; 428/340; 428/524
(58) Field of Search ..................... 428/312.8, 524, 428/103, 167, 340

(56) References Cited

U.S. PATENT DOCUMENTS

| | | | |
|---|---|---|---|
| 3,135,297 A | 6/1964 | Nordberg et al. | 138/144 |
| 3,137,602 A | 6/1964 | Lincoln | 156/89 |
| 3,203,849 A | 8/1965 | Katz et al. | 161/96 |
| 3,407,110 A | 10/1968 | Axelson et al. | 161/68 |
| 3,475,262 A | 10/1969 | Sargent et al. | 161/68 |
| 3,617,416 A | 11/1971 | Kromrey | 156/173 |
| 4,016,322 A | * 4/1977 | Haldeman | 428/246 |
| 4,054,477 A | 10/1977 | Curran | 156/197 |
| 4,100,322 A | 7/1978 | Seibold et al. | 428/257 |
| 4,124,732 A | 11/1978 | Leger | 428/77 |
| 4,151,800 A | 5/1979 | Dotts et al. | 102/105 |
| 4,201,611 A | 5/1980 | Stover | 156/155 |
| 4,215,161 A | 7/1980 | Seibold et al. | 427/228 |
| 4,515,847 A | 5/1985 | Taverna et al. | 428/107 |
| 4,686,128 A | 8/1987 | Gentilman | 428/44 |
| 4,713,275 A | 12/1987 | Riccitiello et al. | 428/76 |
| 4,767,656 A | 8/1988 | Chee et al. | 428/116 |
| 4,892,783 A | 1/1990 | Brazel | 428/282 |
| 5,151,216 A | 9/1992 | Liu | 252/307 |
| 5,291,830 A | 3/1994 | Zwan | 102/293 |

(List continued on next page.)

OTHER PUBLICATIONS

Polymer Sci. Dictionary, 3, Mark Alger ed. (Chapman & Hall 1997).*

*Primary Examiner*—Paul Thibodeau
*Assistant Examiner*—Christopher Paulraj
(74) *Attorney, Agent, or Firm*—Marsh Fischmann & Breyfogle LLP

(57) ABSTRACT

The present invention discloses an insulated reentry heat shield for minimizing heat transfer to a spacecraft structure or the like during atmospheric reentry. The heat shield (10) comprises an outer heat resistant layer (12) including an ablative first material backed by an inner insulating layer (14) including an insulating second material. The outer and inner layers (12, 14) are bonded to one another by a middle layer (16) disposed therebetween. The middle layer is formed by disposing at least one layer of a phenolic loaded third material between the outer and inner layers and heating all three layers simultaneously to remove phenolic volatiles from the middle layer. In one embodiment, the ablative first material is carbon-carbon, the insulating second material is carbon foam, and the phenolic loaded third material is carbon scrim cloth. The present invention also discloses a method for use in constructing a heat shield. The method includes the steps of preparing an outer heat resistant layer comprised of an ablative first material and attaching the outer heat resistant layer to an inner insulating layer comprised of an insulating second material. The outer heat resistant layer is attached to the inner insulating by disposing at least one layer of a phenolic loaded scrim cloth or felt material between the outer heat resistant layer and the inner insulating layer and heating the outer heat resistant layer, the layer(s) of phenolic loaded scrim cloth or felt material, and the inner insulating layer simultaneously to remove phenolic volatiles from the scrim cloth or felt material.

18 Claims, 3 Drawing Sheets

U.S. PATENT DOCUMENTS

| | | | |
|---|---|---|---|
| 5,310,592 A | 5/1994 | Baker et al. | 428/117 |
| 5,413,859 A | 5/1995 | Black et al. | 428/408 |
| 5,511,747 A | 4/1996 | Parrot et al. | 244/158 A |
| 5,540,996 A | 7/1996 | Tanzilli et al. | 428/408 |
| 5,547,628 A | 8/1996 | Lacombe et al. | 264/257 |
| 5,560,569 A | 10/1996 | Schmidt | 244/117 R |
| 5,626,951 A | 5/1997 | Hogenson | 442/262 |
| 5,705,012 A | 1/1998 | Kolodziej et al. | 156/245 |
| 5,736,232 A | 4/1998 | Shih et al. | 428/210 |
| 5,803,406 A | 9/1998 | Kolodziej et al. | 244/158 A |
| 5,804,306 A | 9/1998 | Sorenson et al. | 428/297.4 |
| 5,993,980 A | * 11/1999 | Scmitz et al. | 428/633 |

* cited by examiner

INSULATED REENTRY HEAT SHIELD

RELATED APPLICATION INFORMATION

This application claims the benefit of U.S. Provisional Application Serial No. 60/095674, filed on Aug. 7, 1998.

FIELD OF THE INVENTION

The present invention generally relates to heat shields, and more particularly, to a lightweight insulated heat shield for minimizing heat transfer to, for example, a spacecraft structure during atmospheric reentry.

BACKGROUND OF THE INVENTION

Many different heat shield concepts for minimizing heat transfer to a spacecraft structure during atmospheric reentry are known. Traditional heat shield concepts, such as heat shields comprised of carbon phenolic are relatively heavy and therefore introduce a significant weight penalty to the spacecraft. Conventional carbon-carbon heat shields have a relatively high thermal conductivity which may cause overheating at the heat shield-spacecraft structure interface during reentry. Some available heat shield materials that can withstand moderate reentry heating environments, such as SLA-561V and SIRCA, are unable to survive more severe reentry environments involving high surface pressures (e.g., greater than 0.2 atm) and high heating (e.g., greater than 200 $W/cm^2$). Other materials currently being used for high temperature applications, such as phenolic impregnated carbon ablator (PICA), have surface pressure and heat shield manufacturing limitations.

SUMMARY OF THE INVENTION

In view of the foregoing, one objective of the present invention is to provide a lightweight heat shield for thermal protection applications, such as, for example, minimizing heat transfer to a spacecraft structure during atmospheric reentry.

Another objective of the present invention is to provide a lightweight heat shield capable of withstanding severe reentry environments.

These and other objectives and advantages are achieved by the inventive materials concept for atmospheric reentry heat shields disclosed by the present invention. According to one aspect of the present invention, a heat shield includes an outer heat resistant layer comprised of an ablative first material. The outer heat resistant layer is backed by an inner insulating layer comprised of an insulating second material. The outer and inner layers are bonded to one another by a middle layer formed by disposing at least one layer of a phenolic loaded third material between the outer and inner layers and heating all three layers simultaneously to remove phenolic volatiles from the third material.

In one embodiment, the outer layer comprises carbon-carbon laminate and the inner layer comprises carbon foam. The outer carbon-carbon laminate layer may include an oxidation resistant surface treatment or coating on an outer surface thereof. The middle layer bonding the outer and inner layers together is formed by disposing at least one layer of phenolic loaded carbon scrim cloth between the outer and inner layers and heating all three layers simultaneously to remove phenolic volatiles from the carbon scrim cloth. This results in a middle layer comprised of carbon scrim cloth and phenolic char (i.e. the components of the phenolic resin remaining after removal of the phenolic volatiles). The carbon scrim cloth/phenolic char middle layer provides a compliant bond between the outer and inner layers that can withstand movement without substantial separation between the outer and inner layers as the heat shield undergoes thermal expansion and other stresses during reentry. The bond provided by the middle layer is compliant because all three layers are thermally compatible. The three layers are thermally compatible as a result of having similar coefficients of thermal expansion due to their carbonaceous nature.

In order to further enhance the strength of the bond provided by the middle layer between the carbon-carbon outer layer and the carbon foam inner layer, a layer of carbon scrim cloth may be co-processed with the carbon-carbon laminate when preparing the outer carbon-carbon shell. The carbon scrim cloth may be included as the innermost surface in the carbon-carbon laminate outer layer. This further enhances the bond formed by the middle layer because the carbon scrim cloth provides the outer layer with a rougher inner surface than would otherwise be provided by an outer layer comprised of only carbon-carbon laminate.

In addition to carbon-carbon, the ablative first material comprising the outer layer may, for example, be a carbon-phenolic or a ceramic matrix composite material. Regardless of its composition, the outer layer should be sufficiently thick to provide complete coverage of the inner insulating layer during atmospheric reentry. The appropriate thickness will vary depending upon the expected amount of surface recession of the outer heat resistant layer for a given set of mission parameters (e.g. anticipated surface pressures and heat flux) plus an additional margin necessary to ensure that a sufficiently thick outer layer remains throughout reentry in order to protect the inner layer from gas flow through the outer layer. For example, a carbon-carbon outer heat resistant layer may be between 0.10 and 0.25 inches thick depending upon mission parameters. As another example, a ceramic matrix composite outer layer may be as thin as 0.05 inches, depending upon mission parameters. Also, the outer layer is preferably sufficiently dense in order to inhibit the permeation of gases therethrough during reentry. For example, a carbon-carbon outer heat resistant layer preferably has a density of at least 1.6 grams per cubic centimeter.

In addition to carbon foam, the insulating second material comprising the inner layer may, for example, be reticulated vitreous carbon, graphite felt, ceramic foam, ceramic felt, impregnated microspheres of carbon, or impregnated microspheres of ceramic. The inner insulating layer reduces the rate of heat transport to the spacecraft structure. In this regard, the inner insulating layer will typically be substantially thicker than the heat resistant outer layer in order to ensure that the temperature at the heat shield spacecraft interface is maintained at or below a desired temperature during reentry. Thus, the insulating second material comprising the inner layer preferably has a lower density than the ablative first material comprising the outer layer so that the heat shield remains lightweight.

In addition to carbon scrim cloth, the phenolic loaded third material may, for example, be phenolic loaded carbon felt, ceramic scrim cloth or ceramic felt. Whether carbon scrim cloth or felt or ceramic scrim cloth or felt is appropriate depends upon the nature of the first and second materials comprising the outer and inner layers, respectively. In this regard, when the first and second materials are carbonaceous in nature, the third material is preferably carbon scrim cloth or felt, whereas, when the first and second materials are ceramic in nature, the third material is preferably ceramic scrim cloth or felt. Carbon or ceramic felt, as appropriate for the first and second materials, may provide an even more compliant bond between the outer and inner layers of the heat shield than carbon or ceramic scrim cloth.

In one embodiment, the insulating inner layer may be comprised of a plurality of blocks of the insulating second material. The blocks of the insulating second material are bonded to the outer layer by the middle layer, and adjacent blocks of the insulating second material may also be bonded to one another. For example, adjacent blocks may be bonded to one another by disposing one or more layers of the phenolic loaded third material therebetween, with the phenolic volatiles being removed when the heat shield is heated to remove the phenolic volatiles from the middle layer. As another example, in lower temperature applications, adjacent blocks may be bonded to one another using a low temperature adhesive in combination with one or more layers of scrim cloth between the blocks. The blocks of the insulating second material may be machined to match a spacecraft structure to which the heat shield is attachable.

According to a further aspect of the present invention, a method for use in constructing a heat shield includes the steps of preparing an outer heat resistant layer comprised of an ablative first material and attaching the outer heat resistant layer to an inner insulating layer comprised of an insulating second material. In this regard, the outer heat resistant layer is attached to the inner insulating layer by disposing at least one layer of a phenolic loaded scrim cloth or felt material between the outer heat resistant layer and the inner insulating layer and heating the outer heat resistant layer, the layer(s) of the phenolic loaded scrim cloth or felt material, and the inner insulating layer simultaneously to remove phenolic volatiles.

When the ablative first material comprises carbon-carbon, the step of preparing the outer heat resistant layer may include the steps of performing a conventionally known high temperature graphitization process at least once and performing a conventionally known carbon matrix densification process at least once. In the step of performing a high temperature graphitization process, the outer heat resistant layer is heated to a temperature corresponding to a maximum temperature to which the outer heat resistant layer is expected to be exposed when the heat shield is used. The high temperature graphitization process conditions the outer carbon-carbon layer for withstanding severe reentry environments and may be performed more than once, if necessary. In the step of performing a carbon matrix densification process, carbon is deposited in the voids of the carbon-carbon laminate in order to ensure that a fully dense and uniform carbon-carbon matrix is achieved. The outer layer may undergo one or more carbon matrix densification processes until sufficient density of the carbon-carbon outer layer is achieved.

In addition to the steps of disposing one or more layer(s) of phenolic loaded scrim cloth or felt material between the outer and inner layers and simultaneously heating the outer, scrim cloth or felt, and inner layers, the step of attaching may include the step of loading the scrim cloth or felt material with a phenolic resin. This may be accomplished by soaking it in a phenolic resin. The phenolic resin within which the scrim cloth or felt is soaked may include additives such as, for example, graphite fibers or glass frit, suspended therein.

When the insulating inner layer is comprised of a plurality of blocks of the insulating second material, the method of the present invention may include the additional step of bonding adjacent blocks of the second material to one another. This may be accomplished by disposing at least one layer of the phenolic loaded scrim cloth or felt material between adjacent blocks prior to the step of heating the outer, phenolic loaded scrim cloth or felt, and inner layers simultaneously. Alternatively, in lower temperature applications, adjacent blocks of the insulating second material may be bonded to one another using a low temperature adhesive along with a layer of scrim cloth between adjacent blocks.

These and other features and advantages of the present invention will be apparent upon a review of the following detailed description when taken in conjunction with the accompanying figures.

DETAILED DESCRIPTION

Figure 1:
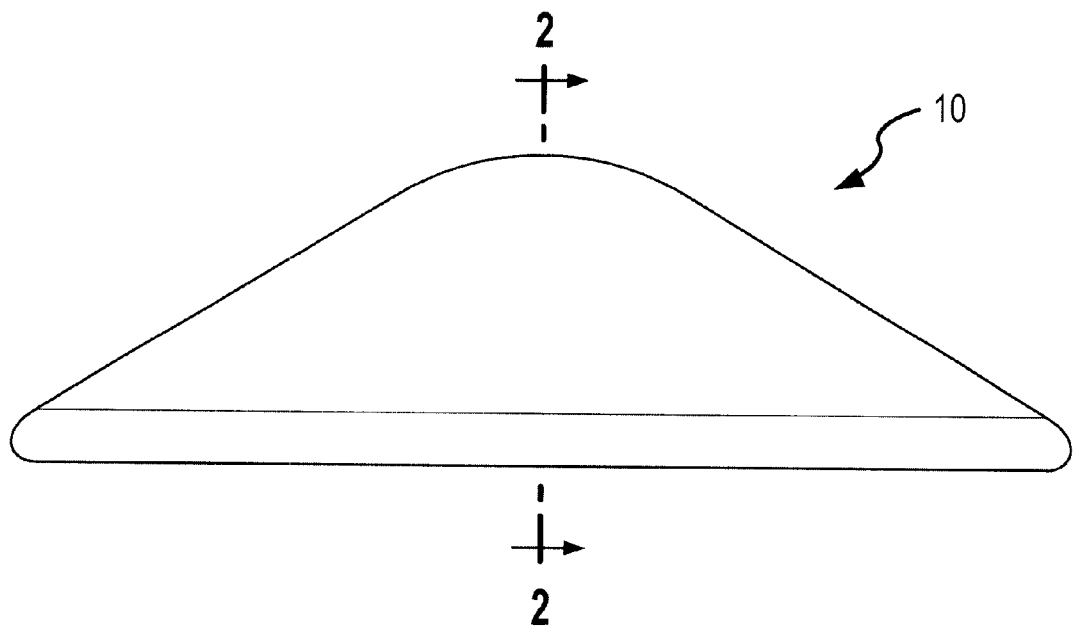
FIG. 1 illustrates a side view of one embodiment of an insulated reentry heat shield in accordance with the present invention.

In FIG. 1, a side view of one embodiment of an insulated reentry heat shield 10 in accordance with the present invention is illustrated. The heat shield 10 may be attached to a spacecraft, such as a sample return capsule, to provide thermal protection for the spacecraft during atmospheric re-entry. Although the shape of the illustrated heat shield 10 is conical, it should be appreciated that the heat shield 10 may be configured in a number of other manners (e.g., cylindrical sections, bullet or nosecap shaped, or rectangular panels and the like for attachment to generally flat surfaces).

Figure 2:
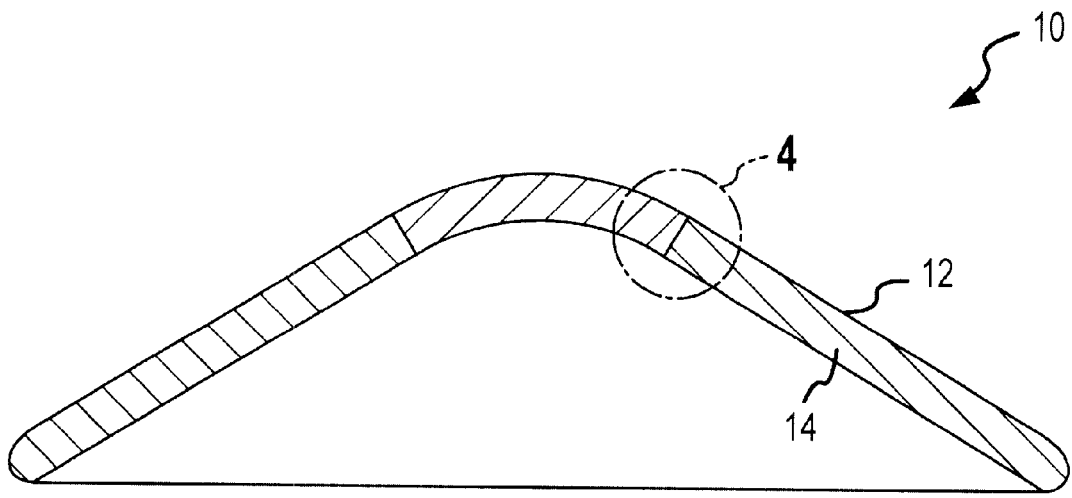
FIG. 2 illustrates a cross-sectional view of the insulated reentry heat shield of FIG. 1 taken along line 2—2 in FIG. 1.
Figure 3:
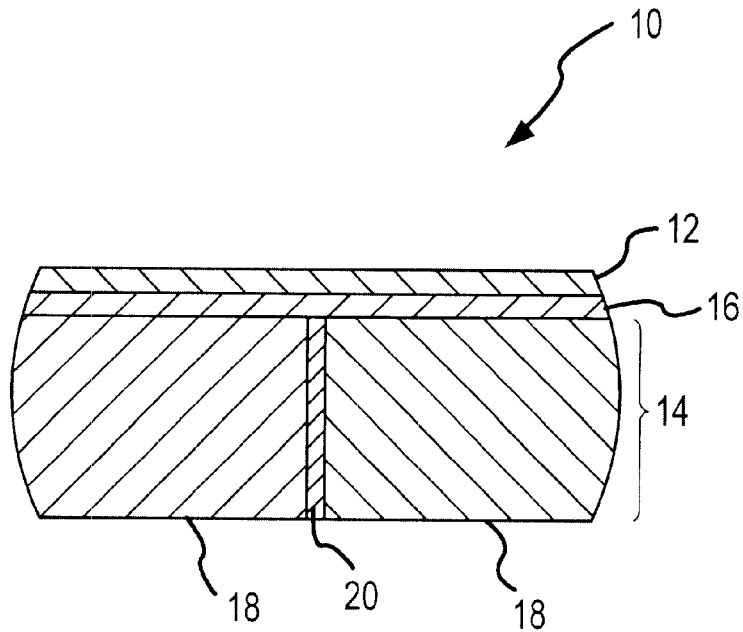
FIG. 3 illustrates a detailed cross-sectional view of the heat shield taken at enlarged area 4 in FIG. 2.

The construction of the heat shield 10 can be seen in the cross-sectional views of FIGS. 2 and 3. The heat shield 10 includes a high temperature heat resistant outer layer 12 backed by a high temperature insulating inner layer 14. The outer layer 12 is comprised of an ablative first material and the inner layer 14 is comprised of a lighter weight insulating second material. The outer and inner layers 12, 14 are bonded to one another by a middle layer 16. The middle layer 16 is formed by disposing one or more layers of a phenolic loaded third material between the outer and inner layers 12, 14 and heating all three layers simultaneously to remove phenolic volatiles from the middle layer 16. As will be further described below, the third material may be a scrim cloth or felt material that has been soaked in phenolic resin.

The outer layer 12 forms a thin continuous outer surface formed to the outer contours of the heat shield 10. The outer layer 12 provides an ablative continuous surface capable of withstanding severe re-entry environments, such as, for example, environments having surface pressures greater than 0.2 atmospheres and heating greater than 200 W/cm$^2$. In the illustrated embodiment, the ablative first material comprising the outer layer 12 is carbon-carbon (e.g. two-dimensional or three-dimensional carbon-carbon laminate). However, it should be appreciated that the outer layer 12 may be comprised of other ablative materials, such as for example, carbon-phenolic and ceramic matrix composite materials. The ablative material comprising the outer layer 12 should be appropriate for the anticipated heat flux during re-entry, which, depending upon mission parameters may, for example, be in the range of 100 W/cm$^2$ to 1000 W/cm$^2$.

To ensure that the outer layer 12 is comprised of a fully dense and uniform carbon-carbon matrix, the outer layer 12 preferably undergoes one or more conventionally known carbon matrix densification procedures wherein voids within the carbon-carbon matrix are filled with carbon. The carbon matrix densification procedure(s) may comprise conventionally known processes such as, for example, a vapor deposition process or repeated impregnations of phenolic resin with subsequent heat treatment to remove phenolic volatiles. Filling the voids helps prevent gases from permeating through the outer layer 12 to the inner layer 14 during reentry. Preferably, the carbon-carbon outer layer 12 has a density of at least 1.6 grams per cubic centimeter. To further enhance its capability of withstanding severe reentry conditions, the carbon-carbon outer layer 12 may undergo a conventionally known high temperature graphitization process. The temperature of the graphitization process may be varied depending upon the maximum expected temperature to which the outer layer 12 is expected to be exposed on a given mission. In addition to undergoing carbon matrix densification and high temperature graphitization processes, the outer layer 12 should be sufficiently thick to provide complete coverage of the inner layer 14 during re-entry. The appropriate thickness for the outer layer 12 varies depending upon mission parameters, such as expected surface pressure and heat flux, that effect the expected amount of surface recession plus an additional margin necessary to ensure that a sufficiently thick outer layer 12 remains throughout reentry in order to protect the inner layer 14 from gas flow through the outer layer 12. For a carbon-carbon outer layer 12, its thickness is preferably between about 0.10 and 0.25 inches.

The insulating inner layer 14 prevents overheating at the interface of the heat shield and the spacecraft (i.e. at the inner surface of the inner layer 14). In this regard, the inner layer 14 should be sufficiently thick in order to maintain the heat shield/spacecraft interface below a desired temperature depending upon the anticipated heat flux for a given mission. The desired temperature at the heat shield/spacecraft interface may be determined, for example, by bond strength requirements between the heat shield 10 and spacecraft structure. Typically as is illustrated, the inner layer 14 will be substantially thicker than the outer layer 12. In this regard, the second material comprising the inner layer 14 should be less dense than the first material comprising the outer layer 12 so that, despite the substantial thickness of the inner layer 14 in comparison to the outer layer 12, the overall weight of the heat shield 10 is minimal. In the illustrated embodiment, the second material comprises carbon foam (e.g. Fiberform from Fiber Materials, Inc.). Other appropriate insulating materials include, for example, reticulated vitreous carbon, graphite felt, ceramic foam, ceramic felt, and impregnated microspheres of carbon, ceramic or other like metals.

In the illustrated embodiment, the middle layer 16 is formed by disposing one or more layers of phenolic loaded carbon scrim cloth between the outer and inner layers 12, 14. The three layers, 12, 14, 16 undergo a carbonization cycle wherein they are heated to an appropriate temperature (e.g. about 1500° F.) to remove phenolic volatiles from the middle layer. This results in a middle layer comprised of carbon scrim cloth and phenolic char. Carbon scrim cloth is used so that the material comprising the middle layer 16 has a similar chemical composition as both the first material comprising the outer layer 12 (i.e. carbon-carbon) and the second material comprising the inner layer 14 (i.e. carbon foam). The scrim cloth may be loaded with the phenolic resin before it is placed between the outer and inner layers 12, 14 by soaking the scrim cloth in a phenolic resin. The phenolic resin within which the scrim cloth is soaked may have additives such as, for example, graphite fibers or glass frit suspended therein. Such additives help enhance the strength of the bond between the outer and inner layers 12, 14 by providing additional attachment points within the middle layer 16. Using carbon scrim cloth to bond the carbon-carbon outer layer 12 with the carbon foam inner layer 14 provides a compliant bond between the outer and inner layers 12, 14 that can withstand movement without substantial separation between the outer and inner layers 12, 14 as they undergo thermal expansion and other stresses during re-entry. The bond is compliant because all three layers 12, 14, 16 have similar coefficients of thermal expansion due to their carbonaceous nature. Thus, as the heat shield expands and contracts during reentry, all three layers 12, 14, 16 expand and contract at similar rates.

It should be appreciated that when the first and second materials comprising the outer and inner layers 12, 14 are not carbonaceous, a different type of scrim cloth material may be appropriate. For example, if the outer and inner layers 12, 14 are comprised of ceramic ablative and insulating materials, respectively, a ceramic scrim cloth material is appropriate for the middle layer 16. Furthermore, one or more layers of a phenolic loaded felt material (e.g. carbon felt or ceramic felt, as appropriate) may be used instead of phenolic loaded scrim cloth. Such felt material may provide an even more compliant bond between the outer and inner layers 12, 14.

Though the inner layer 14 may be continuous, it may also be comprised of a plurality of individual blocks 18 of the insulating second material, as is illustrated. Each block 18 is bonded to the outer layer 12 by the middle layer 16 and may be machined to match the outer contours of a spacecraft or other mating structure that the heat shield is intended to protect. In addition to being bonded to the carbon-carbon outer layer 12, adjacent blocks 18 may also bonded to one another. Adjacent blocks 18 may be bonded to one another using one or more layers of phenolic loaded scrim cloth or felt material disposed in the gaps 20 between adjacent blocks, such as illustrated. Phenolic volatiles are removed from the scrim cloth or felt in the bond gaps 20 when all three layers 12, 14, 16 are carbonized to remove phenolic volatiles from the middle layer 16. The scrim cloth or felt material used should be of a similar chemical nature as the insulating second material (e.g. if the insulating second material is carbon foam, carbon scrim cloth or felt should be used). As an alternative, a low temperature adhesive in combination with one or more layers of scrim cloth may be used to bond the blocks 18 to one another. If a low temperature adhesive is used, then no high temperature processing is necessary, but the use of a low temperature adhesive to bond adjacent blocks 18 is limited to lower temperature applications of the heat shield 10 wherein the heat shield 10 will not be heated to the point that the low temperature adhesive breaks down forming gases that could contaminate the spacecraft structure. There are advantages to each of the techniques for bonding adjacent blocks 18. Using one or more layers of scrim cloth or felt material in the gaps 20 to bond the blocks 18 facilitates enhanced load transfer between adjacent blocks 18. Also, the charred phenolic resin remaining in the gaps 20 is porous and thus reduces thermal conductivity along the gaps 20. Using a low temperature adhesive isolates each of the blocks 18 and also provides for low thermal conductivity along the bond gaps 20 between adjacent blocks 18.

The outer layer 12 of carbon-carbon bonded with the inner layer 14 of insulating carbon foam by the middle layer 16 of carbon scrim cloth provides an integral lightweight heat shield 10 that is able to withstand severe re-entry environments. In order to provide attachment points through the heat shield 10, carbon-carbon blocks may be bonded to the outer layer 12 at desired attachment locations or the carbon-carbon outer layer 12 may be locally thickened at the attachment locations. Both the bonded carbon-carbon blocks and the locally thickened outer layer 12 concepts provide good structural strength.

While the outer, inner and middle layers 12, 14, 16 may be comprised of various appropriate ablative, insulating and scrim cloth or felt materials such as summarized above, the three layers are preferably comprised of materials having similar coefficients of thermal expansion and chemical composition. For example, the three layers may be comprised of carbonaceous materials such as carbon-carbon laminate, carbon scrim cloth, and carbon foam. As another example, the three layers may be comprised of ceramic materials, such as ceramic matrix composite, ceramic scrim cloth and ceramic foam.

Figure 4:
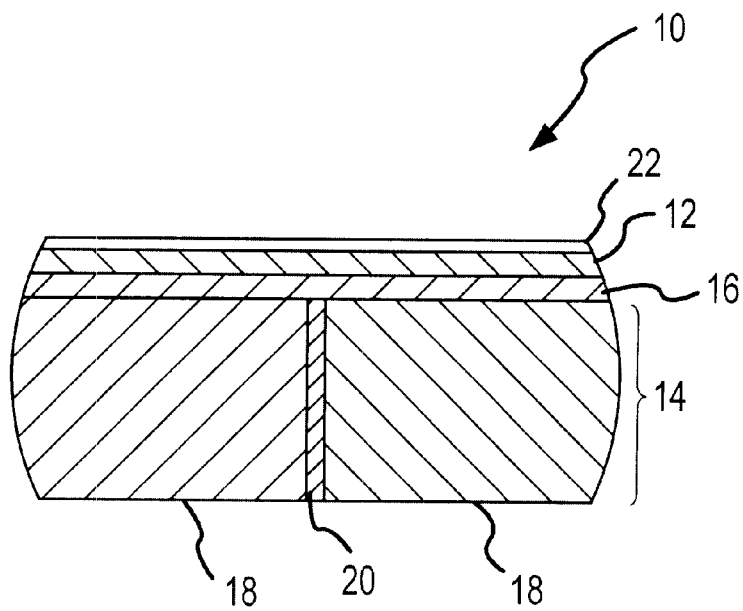
FIG. 4 illustrates a detailed cross-sectional view of the heat shield taken at enlarged area 4 in FIG. 2 wherein the outer heat resistant layer includes an oxidation resistant layer deposited thereon.

Referring now to FIG. 4, to further enhance the ability of the heat shield 10 to withstand severe reentry environments, the outer layer 12 of the heat shield 10 may have an oxidation resistant coating 22 deposited on an outer surface thereof. For example, when the outer layer 12 of the heat shield 10 comprises carbon-carbon, the oxidation resistant layer may comprise a thin layer of silicon carbide. It will be appreciated that the oxidation resistant layer 24 may comprise other appropriate oxidation resistant materials known in the art.

Typically, a heat shield 10 such as described above is configured for attachment to a separate structural component. Attachment of the heat shield 10 to a separate structural component may, for example, be accomplished using phenolic loaded scrim cloth or felt material in a manner similar to that used to bond the outer and inner layers 12, 14 together. In such instances, the heat shield 10 functions only as a thermal protection system and relies upon the separate structural component for structural strength. However, when appropriately constructed, the heat shield 10 may function as a combined thermal protection system and structure. For example, the inner insulating layer 14 may include honeycomb cores of high temperature carbon or ceramic. Such honeycomb cores may provide the heat shield 10 with sufficient structural strength such that the heat shield 10 need not be attached to a separate structural component.

Figure 5:
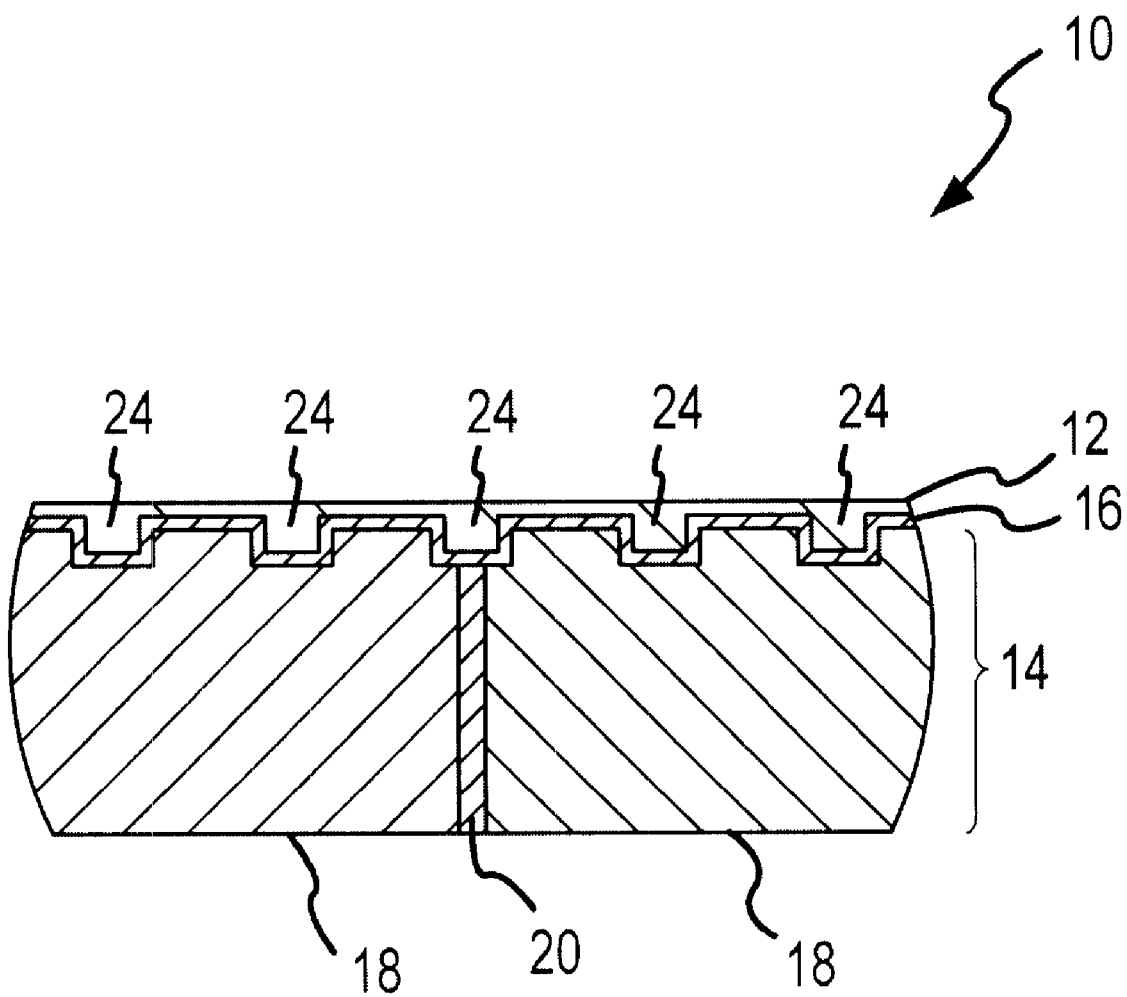
FIG. 5 illustrates a detailed cross-sectional view of the heat shield taken at enlarged area 4 in FIG. 2 wherein the outer heat resistant layer is configured to include a plurality of structural ribs on an inner surface thereof.

FIG. 5 shows another example wherein the heat shield 10 is configured to provide a thermal protection system with adequate independent structural strength. In FIG. 5, the heat shield 10 includes an ablative outer layer 12 bonded to an insulating inner layer 14 by a middle layer 16 of phenolic loaded scrim cloth or felt material. The outer layer 12 includes a plurality of ribs 24 formed on an inner surface thereof. The ribs 24 stiffen the outer layer 12 thereby obviating the need to attach the heat shield 10 to a separate structural component.

While various embodiments of the present invention have been described in detail, it is apparent that further modifications and adaptations of the invention will occur to those skilled in the art. However, it is expressly understood that such modifications and adaptations are within the spirit and scope of the present invention.

What is claimed is:

1. A heat shield comprising:
   an outer heat resistant layer comprising an ablative first material;
   an inner insulating layer comprising an insulating second material; and
   a middle layer bonding said outer heat resistant layer and said inner insulating layer together, wherein said middle layer is formed by disposing at least one layer of a phenolic loaded third material between said outer heat resistant layer and said inner insulating layer and heating said outer heat resistant layer, said middle layer, and said inner insulating layer simultaneously to remove phenolic volatiles from said middle layer;
   wherein said first, second, and third materials are ceramic.

2. A heat shield comprising:
   an outer heat resistant layer comprising an ablative first material;
   an inner insulating layer comprising an insulating second material; and
   a middle layer bonding said outer heat resistant layer and said inner insulating layer together, wherein said middle layer is formed by disposing at least one layer of a phenolic loaded third material between said outer heat resistant layer and said inner insulating layer and heating said outer heat resistant layer, said middle layer, and said inner insulating layer simultaneously to remove phenolic volatiles from said middle layer;
   wherein said inner insulating layer includes a plurality of blocks of said second material and wherein adjacent said blocks are bonded to each other by disposing a phenolic loaded third material therebetween and heating said heat shield to remove phenolic volatiles from said third material.

3. The heat shield of claim 2 wherein said first material comprises one of carbon-carbon, carbon-phenolic, and ceramic matrix composite materials.

4. The heat shield of claim 2 wherein said second material comprises one of carbon foam, reticulated vitreous carbon, graphite felt, ceramic foam, ceramic felt, impregnated microspheres of carbon, impregnated microspheres of ceramic, honeycomb cores of carbon, and honeycomb cores of ceramic.

5. The heat shield of claim 2 wherein said inner insulating layer has a lower density than said outer heat resistant layer.

6. The heat shield of claim 2 wherein said phenolic loaded third material comprises one of phenolic loaded carbon scrim cloth, carbon felt, ceramic scrim cloth, and ceramic felt.

7. The heat shield of claim 2 wherein said first, second, and third materials are carbonaceous.

8. The heat shield of claim 2 wherein said outer heat resistant layer has a thickness between 0.05 inches and 0.25 inches.

9. A heat shield comprising:
   an outer layer comprised of carbon-carbon laminate;
   an inner layer backing said outer layer, said inner layer comprising carbon foam; and
   a middle layer bonding said outer layer and said inner layer together, wherein said middle layer is formed by disposing at least one layer of a phenolic loaded first material between said outer layer and said inner layer and heating said outer layer, said middle layer, and said inner layer simultaneously to remove phenolic volatiles from said middle layer, wherein the first material is selected from a first group consisting of phenolic loaded carbon scrim cloth and phenolic loaded carbon felt;

wherein said inner layer includes a plurality of blocks of said carbon foam material, adjacent said blocks being bonded to each other by disposing a phenolic loaded second material therebetween and heating said heat shield to remove phenolic volatiles from said phenolic loaded second material, wherein said phenolic loaded second material is selected from a second group consisting of phenolic loaded carbon scrim cloth and phenolic loaded carbon felt.

10. The heat shield of claim 9 wherein said carbon-carbon laminate is two-dimensional.

11. The heat shield of claim 9 wherein said carbon-carbon laminate is three-dimensional.

12. The heat shield of claim 9 wherein said outer layer has a density of at least 1.6 grams per cubic centimeter.

13. The heat shield of claim 9 wherein said outer layer has a thickness between 0.10 and 0.25 inches.

14. The heat shield of claim 9 wherein said outer layer includes an oxidation resistant layer deposited on an outer surface thereof.

15. The heat shield of claim 9 wherein said outer layer includes a layer of carbon scrim cloth on an inner surface thereof.

16. A heat shield comprising:

an outer layer comprised of carbon-carbon laminate;

an inner layer backing said outer layer, said inner layer comprising carbon foam; and a middle layer bonding said outer layer and said inner layer together, wherein said middle layer is formed by disposing at least one layer of a phenolic loaded first material between said outer layer and said inner layer and heating said outer layer, said middle layer, and said inner layer simultaneously to remove phenolic volatiles from said middle layer, wherein the first material is selected from a group consisting of phenolic loaded carbon scrim cloth and phenolic loaded carbon felt;

wherein said inner layer includes a plurality of blocks of said carbon foam material, adjacent said blocks being bonded to each other by a low temperature adhesive and at least one layer of a scrim cloth material disposed therebetween.

17. A heat shield comprising:

an outer layer comprised of carbon-carbon laminate, said outer layer including a plurality of ribs for providing structural strength formed on an inner surface thereof;

an inner layer backing said outer layer, said inner layer comprising carbon foam; and a middle layer bonding said outer layer and said inner layer together, wherein said middle layer is formed by disposing at least one layer of a phenolic loaded first material between said outer layer and said inner layer and heating said outer layer, said middle layer, and said inner layer simultaneously to remove phenolic volatiles from said middle layer, wherein the first material is selected from a group consisting of phenolic loaded carbon scrim cloth and phenolic loaded carbon felt.

18. A heat shield comprising:

an outer heat resistant layer comprising an ablative first material;

an inner insulating layer comprising an insulating second material; and a middle layer bonding said outer heat resistant layer and said inner insulating layer together, wherein said middle layer is formed by disposing at least one layer of a phenolic loaded third material between said outer heat resistant layer and said inner insulating layer and heating said outer heat resistant layer, said middle layer, and said inner insulating layer simultaneously to remove phenolic volatiles from said middle layer;

wherein said inner insulating layer includes a plurality of blocks of said second material and wherein adjacent said blocks are bonded to each other by a low temperature adhesive and at least one layer of a scrim cloth material disposed therebetween.

* * * * *

UNITED STATES PATENT AND TRADEMARK OFFICE
CERTIFICATE OF CORRECTION

PATENT NO. : 6,558,785 B1
DATED : May 6, 2003
INVENTOR(S) : Rawal et al.

It is certified that error appears in the above-identified patent and that said Letters Patent is hereby corrected as shown below:

<u>Column 8,</u>
Lines 40, 46 and 52, delete the word "and", and insert therefor -- or --.

Signed and Sealed this

Twenty-sixth Day of August, 2003

JAMES E. ROGAN
*Director of the United States Patent and Trademark Office*